May 3, 1949.  J. W. DAWSON  2,469,294
INDUCTION MOTOR CONTROL SYSTEM
Filed March 1, 1946
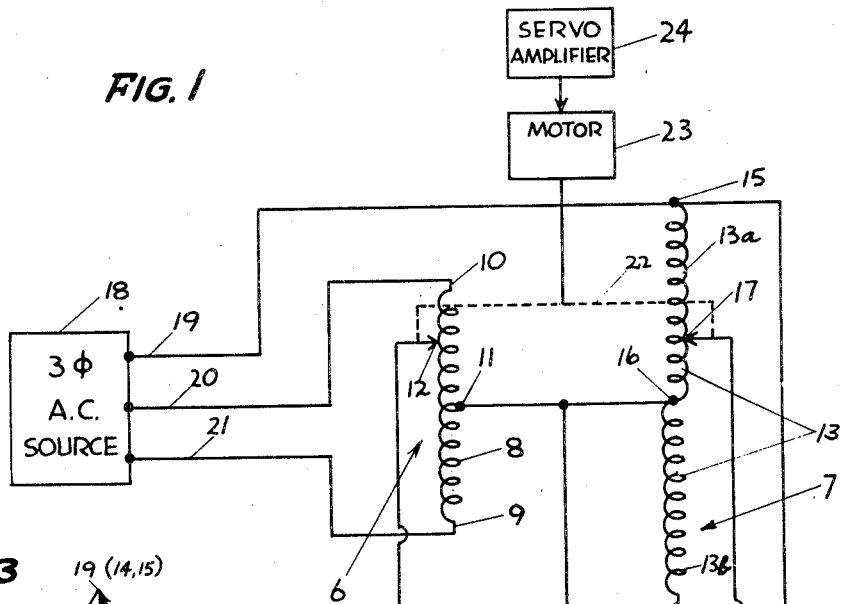
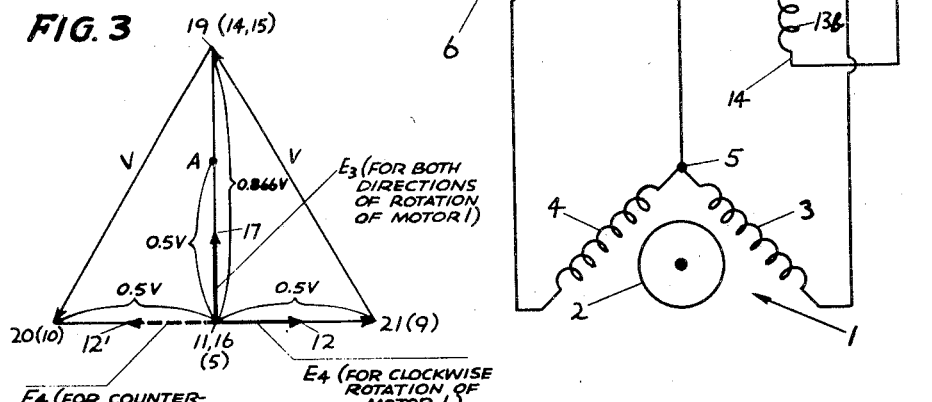
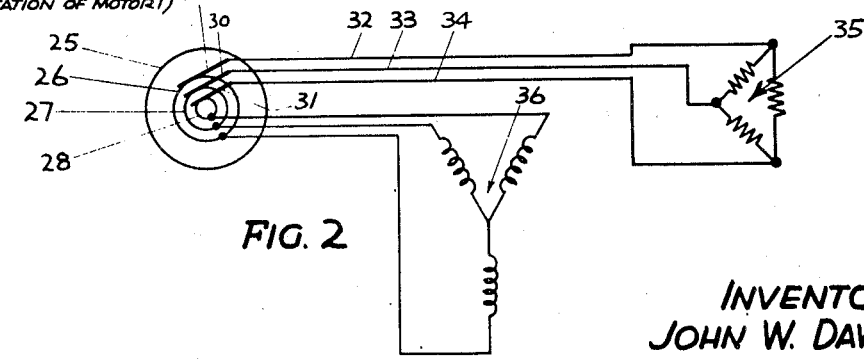
INVENTOR
JOHN W. DAWSON
BY Elmer J. Gorn
ATTY.

Patented May 3, 1949

2,469,294

UNITED STATES PATENT OFFICE 2,469,294

INDUCTION MOTOR CONTROL SYSTEM

John W. Dawson, West Newton, Mass., assignor to Raytheon Manufacturing Company, Newton, Mass., a corporation of Delaware Application March 1, 1946, Serial No. 651,079

6 Claims. (Cl. 318—230)

This invention relates to control systems, and more particularly to a circuit for controlling two-phase electric motors.

An object of the invention is to provide a means for controlling high-powered motors without the necessity of using high-capacity control equipment.

Another object of this invention is to devise a circuit whereby motors of high power may be controlled with the expenditure of only a small amount of power for control purposes.

A further object is to provide a means for simultaneously and smoothly varying both phase voltages applied to a two-phase motor.

A still further object of the invention is to accomplish the above objects in a relatively inexpensive manner.

The foregoing and other objects of the invention will be best understood from the following description of an exemplification thereof, reference being had to the accompanying drawings, wherein:

Fig. 1 is a diagrammatic representation of an embodiment of the invention;

Fig. 2 is a schematic representation of a modification of an element of Fig. 1; and Fig. 3 is a vector diagram illustrating certain principles of operation of Fig. 1.

In Fig. 1, a two-phase induction motor 1 is the motor which is to be controlled. This motor includes a rotor 2, for example of the wound type, having a high resistance and two separate stator windings 3 and 4 displaced ninety degrees from each other. One end of each of the windings 3 and 4 is connected to a common terminal 5. Two brush-type continuously-variable autotransformers 6 and 7 are provided. Transformer 6 comprises a winding 8 having two end terminals 9 and 10 and a midtap 11, together with a brush or contact 12, the position of which is continuously variable along said winding. Transformer 7 comprises a winding 13 having two end terminals 14 and 15 and a midtap 16, together with a brush or contact 17, the position of which is continuously variable along said winding. Winding 13 is represented as being longer than winding 8, for reasons that will be explained hereinafter. The two halves 13a and 13b of winding 13 are wound in opposite directions, half 13a being wound in a clockwise direction for example, while half 13b may be wound in a counterclockwise direction.

A three-phase alternating current source 18 is provided, having three leads 19, 20, and 21 connected thereto. Lead 20 is connected to one end terminal 10 of winding 8, while lead 21 is connected to the other end terminal 9 of winding 8, thereby effectively establishing the voltage of one phase of the source across winding 8. Lead 19 is connected to the two end terminals 14 and 15 of winding 13. Midtaps 11 and 16 are connected together and to the common terminal 5 of phase windings 3 and 4. The lead from brush 12 is connected to the end terminal of winding 4 which is opposite from terminal 5, while the lead from brush 17 is connected to the end terminal of winding 3 which is opposite from terminal 5. It may therefore be seen that the voltage applied to phase 4 of motor 1 is that provided between brush 12 and midtap 11, while the voltage applied to phase 3 of motor 1 is that appearing between brush 17 and midtap 16.

Brushes 12 and 17 are mechanically connected together, as indicated at 22, so as to be moved simultaneously and in synchronism by a common operating means 23. This operating means 23 may be either a motor or a solenoid. If means 23 is a motor, the rotary motion thereof may be converted to translatory motion to move the brushes by any suitable means. If means 23 is a solenoid, which inherently produces translatory motion, the operating plunger thereof may, for example, be connected directly to the brush arms. Although windings 8 and 13 have been represented as being linearly disposed, it will be appreciated by those skilled in the art that said windings may be wound in circular form if desired, in which event the brushes 12 and 17 will also move in a circular path and the rotary movement of motor 23 may be utilized to operate brushes 12 and 17 through any suitable gearing. The operating means 23 is in turn operated by the output of a servo amplifier 24. This servo amplifier may be any suitable low power amplifier which produces an output voltage in response to a change in a certain condition. It should contain suitable anti-hunt features, and is preferably of the electronic type.

Fig. 3 is a vector diagram showing certain relations of the voltages in the circuit of Fig. 1. In this figure, points 19, 20, and 21 are shown at the vertices of an equilateral triangle representing the phase voltages of the three-phase source 18. Points 11 and 16 are connected together and, because 11 is the midtap of winding 8 which is connected across leads 20 and 21, these points are located midway between 20 and 21 along the phase voltage vector 20—21. If the source phase voltage is V, points 11 and 16 will be located, in the diagram, a distance of 0.5 v. from vertices 20 and 21. Since point 16 is halfway between vertices 20 and 21, vector 16, 19 will be at right angles to vector 20, 21 and will represent the voltage appearing in either half of winding 13, while vector 20, 21 will represent the voltage appearing in winding 8. Vector 16, 19 has a length of 0.866 v. as will be apparent to those skilled in the art. As brush 12 travels from one end of winding 8 to the other, the voltage $E_4$ (represented by vector 11—12 in Fig. 3) applied to phase 4 of motor 1 will be varied in both magnitude and realtive polarity or direction, being equal to 0.5 v. when brush 12 is at one end 10 of the winding, zero when it is at the midpoint of the winding, and again equal to 0.5 v. when it is at the opposite end 9, but of opposite relative polarity or direction, as will be seen from Fig. 3. In Fig. 3, vector 11—12 indicates $E_4$ for a opsition of brush 12 on the 21—9 side of midtap 11, while vector 11—12' indicates $E_4$ for a position of brush 12 an equal distance from midtap 11 but on the 20—10 side thereof. Voltage $E_4$ may be termed the cross-phase voltage of motor 1, while voltage $E_3$ (the voltage applied to phase 3 of motor 1) may be termed the reference-phase voltage of said motor. As brush 17 travels along the winding 13, it will be apparent, from Fig. 3, that voltage $E_3$ (represented by vector 16—17) varies, in amplitude only, along line 16—19. Therefore voltage $E_4$ is always displaced in phase ninety degrees from voltage $E_3$ but lags or leads $E_3$ depending on whether brush 12 is on one side or the other of midtap 11. As voltage $E_4$ is varied, in amplitude and relative phase, by the movement of brush 12, the speed and direction of rotation of motor 1 will be correspondingly continuously varied, from a maximum speed in one direction, through standstill to a maximum speed in the opposite direction.

It has been found desirable to vary the reference-phase voltage, along with the cross-phase voltage, in order to prevent the very high heating attendant on constant excitation of the reference phase. According to the invention, the two motor-phase voltages are maintained equal in amplitude at all times, both voltages being varied together because of the fact that brushes 12 and 17 are moved synchronously and simultaneously by a common operating means. In Fig. 3, vector 16—17 is equal in amplitude to vectors 11—12 and 11—12' and represents the voltage applied to phase 3 of the motor for each of the two oppositely-directed voltages 11—12 and 11—12'. If brush 17 began at one end of winding 13 and travelled from one end of said winding to the other, the voltage $E_3$ would vary in magnitude from 0.866 v., to zero at the midtap 16, and back to 0.866 v. at the opposite end of the winding, as will be seen from an examination of Fig. 3. This voltage would not vary in relative polarity or direction because the two ends of the winding 13 are connected to the same phase lead of the three-phase source. If the voltage of the reference phase is to be maintained equal in value to the voltage of the cross phase at all times, it is necessary that winding 13 be of greater length than winding 8, so that when brush 12 is at either limit of its movement, brush 17 will be at such a distance from the corresponding end of winding 13 that a voltage of 0.5 v. will be applied to phase 3 of motor 1, since at this position of brush 12, the cross phase voltage $E_4$ has a value of 0.5 v., as described above. In Fig. 3, point A is on line 16—15 at a distance of 0.5 v. from point 16, and represents the extreme limits of travel of brush 17, or the maximum values of voltage $E_3$ applied to motor winding 3. If the two windings 8 and 13 are of linear construction, the ratio between the half-lengths of windings 8 and 13 will be $$\frac{0.5}{0.866}$$

Since brushes 12 and 17 are mechanically connected together to be operated simultaneously and synchronously by the motor 23, the amplitudes of both motor-phase voltages will be varied in like manner at all times and will be equal at all times. By variation of the amplitude and also the relative polarity of one of the phase voltages, complete control of the speed of motor 1 may be had.

The motor 1 is designed to produce a substantial torque at low motor speeds. Its rotor 2 is therefore of the wound type and ordinarily has a high resistance. At low speeds of induction motor 1, the slip will be high and consequently a large current will be induced in the rotor. This large current flowing through the high resistance of the rotor will produce a large amount of heat in the motor itself, which may be detrimental to the operation of the motor. In order to avoid this detriment, the rotor schematically shown in Fig. 2 may be used in the motor of Fig. 1. In Fig. 2, a rotor 25 has a three-phase low-resistance winding 36 thereon, this winding 36 being connected in any desired manner, for example star-connected as shown. The three terminals of winding 36 are connected to three slip-rings 26, 27, and 28 on which bear brushes 29, 30, and 31, respectively, to which are attached leads 32, 33, and 34, respectively. Leads 32, 33, and 34 are connected to the three vertices of a delta-connected resistance network 35. When the rotor 25 of Fig. 2 is used in the motor 1 of Fig. 1, high currents induced in rotor 25 at low motor speeds do not produce any appreciable amount of heat in the motor itself due to the extremely low resistance of the rotor. These currents are conducted, by means of the slip-rings and leads, to the resistance network 35, where most of the heat or $RI^2$ loss will be dissipated, but where it may be efficiently disposed of, since the network is remote from the motor itself.

The brushes 12 and 17 of the transformers require only a small amount of force to move them, while the motor 1 may be one of rather large power. Therefore, the transformers 6 and 7 act in effect as power amplifiers. Due to the small amount of torque required from motor 23, the servo amplifier 24 is required to have only a small power output, so that large power tubes are not required in this amplifier, as would be necessary if the amplifier were to be used directly as the power source for the high-powered motor. The circuit of this invention will provide a powerful variable-speed drive, without a commutator and its attendant disadvantages. By the use of this invention, pure sine wave voltages may be supplied to the motor phases, which is not always possible with other circuits.

Of course, it is to be understood that this invention is not limited to the particular details as described above, as many equivalents will suggest themselves to those skilled in the art. It is accordingly desired that the appended claims be given a broad interpretation commensurate with the scope of this invention within the art.

What is claimed is:

1. A motor control circuit comprising a two-phase A. C. motor the speed of which is to be controlled, said motor having separate windings for each phase, a three-phase alternating current source having three terminals, a pair of transformer windings each having a continuously-variable contact thereon, one of said transformer windings comprising two sections wound in opposite directions and connected at their junction to the mid-point of the other of said transformer windings, circuit means connecting the two ends of said one transformer winding together and to one of said terminals and the two ends of said other transformer winding to the other two of said terminals, means connecting each of said contacts to one of the windings of said motor, and means for simultaneously varying the positions of said contacts on their respective windings.

2. A motor control circuit comprising a two-phase A. C. motor the speed of which is to be controlled, said motor having separate windings for each phase, a three-phase alternating current source having three leads, a pair of transformer windings each having a continuously-variable contact thereon, means connecting one of said transformer windings between two of said leads, means connecting both ends of the other of said transformer windings to the third of said leads, means connecting each of said contacts to one of the windings of said motor, and means for varying the positions of said contacts on their respective windings simultaneously and in the same direction.

3. A motor control circuit comprising a two-phase A. C. motor the speed of which is to be controlled, said motor having two separate phase windings with a common terminal, a three-phase alternating current source, a pair of transformer windings each having a midtap and a continuously-variable contact thereon, means connecting said transformer windings to said source, means connecting said two midtaps together and to said common terminal, means connecting one of said contacts to a terminal of one of said motor windings opposite from said common terminal, means connecting the other of said contacts to a terminal of the other of said motor windings opposite from said common terminal, and means for varying the positions of said contacts on their respective windings simultaneously and in the same direction.

4. A motor control circuit comprising a two-phase A. C. motor the speed of which is to be controlled, said motor including two separate windings having a common terminal, a three-phase alternating current source, a pair of transformer windings each having a midtap and a continuously-variable contact thereon, one of said transformer windings having its two halves wound in opposite directions, means connecting said transformer windings to said source, means connecting said two midtaps together and to said common terminal, means connecting one of said contacts to a terminal of one of said motor windings opposite from said common terminal, means connecting the other of said contacts to a terminal of the other of said motor windings opposite from said common terminal, and means for varying the positions of said contacts on their respective windings simultaneously and in the same direction.

5. A motor control circuit comprising a two-phase A. C. motor the speed of which is to be controlled, said motor including two separate windings having a common terminal, a three-phase alternating current source, a pair of transformer windings each having a midtap and a continuously-variable contact thereon, means connecting said transformer windings to said source, means connecting said two midtaps together and to said common terminal, means connecting one of said contacts to a terminal of one of said motor windings opposite from said common terminal, means connecting the other of said contacts to a terminal of the other of said motor windings opposite from said common terminal, and means for varying the positions of said contacts on their respective windings simultaneously and in the same direction, said last means and said transformer windings being arranged in such a manner that the contact on one of said transformer windings does not travel over the full length of its winding.

6. A motor control circuit comprising a two-phase A. C. motor the speed of which is to be controlled, said motor including two separate windings having a common terminal, a three-phase alternating current source having three leads, a pair of transformer windings each having a midtap and a continuously-variable contact thereon, one of said transformer windings having its two halves wound in opposite directions, means connecting both ends of said one transformer winding to one of said leads, means connecting the other of said transformer windings between the other two of said leads, means connecting said two midtaps together and to said common terminal, means connecting one of said contacts to a terminal of one of said motor windings opposite from said common terminal, means connecting the other of said contacts to a terminal of the other of said motor windings opposite from said common terminal, and means for varying the positions of said contacts on their respective windings simultaneously and in the same direction.

JOHN W. DAWSON.

REFERENCES CITED

The following references are of record in the file of this patent:

UNITED STATES PATENTS

| Number | Name | Date |
| --- | --- | --- |
| 591,879 | Reist | Oct. 19, 1897 |
| 609,990 | Lamme | Aug. 30, 1898 |
| 726,391 | Armstrong et al. | Apr. 28, 1903 |
| 729,199 | Meyer | May 29, 1903 |
| 1,696,964 | Morrison | Jan. 1, 1929 |
| 1,713,223 | Green | May 14, 1929 |
| 2,228,078 | Gulliksen | Jan. 7, 1941 |